United States Patent Office 3,257,145
Patented June 21, 1966

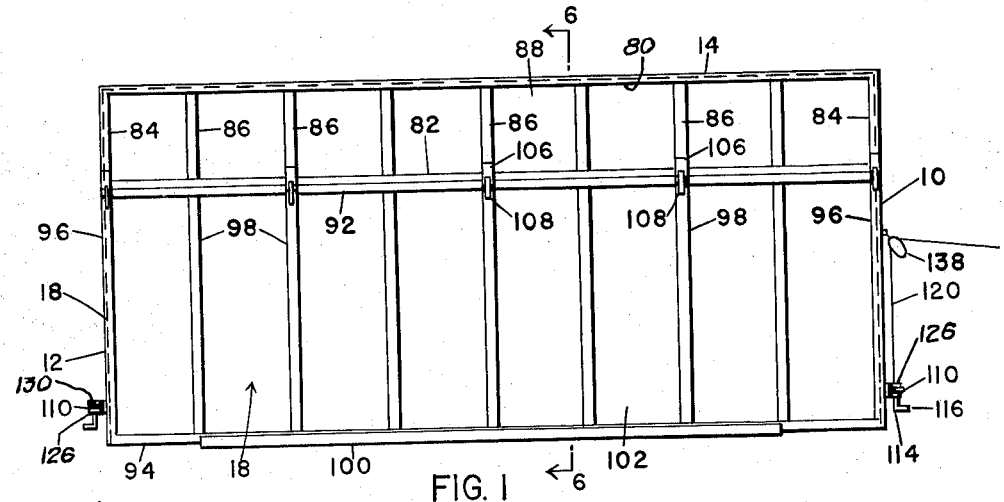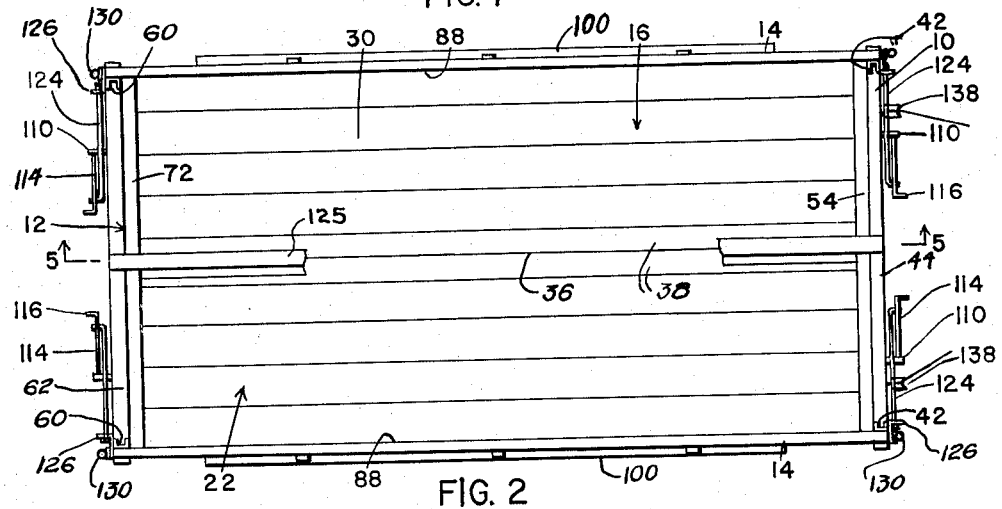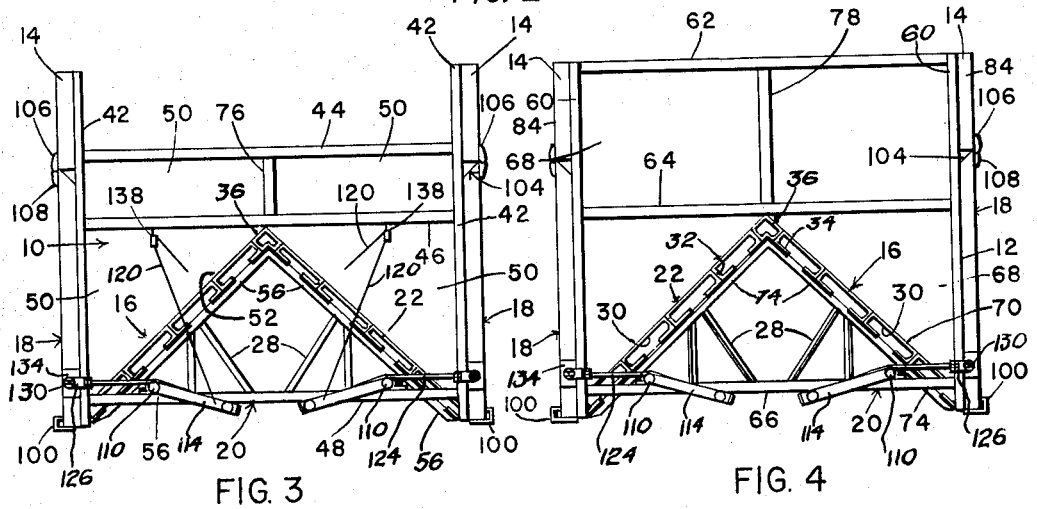

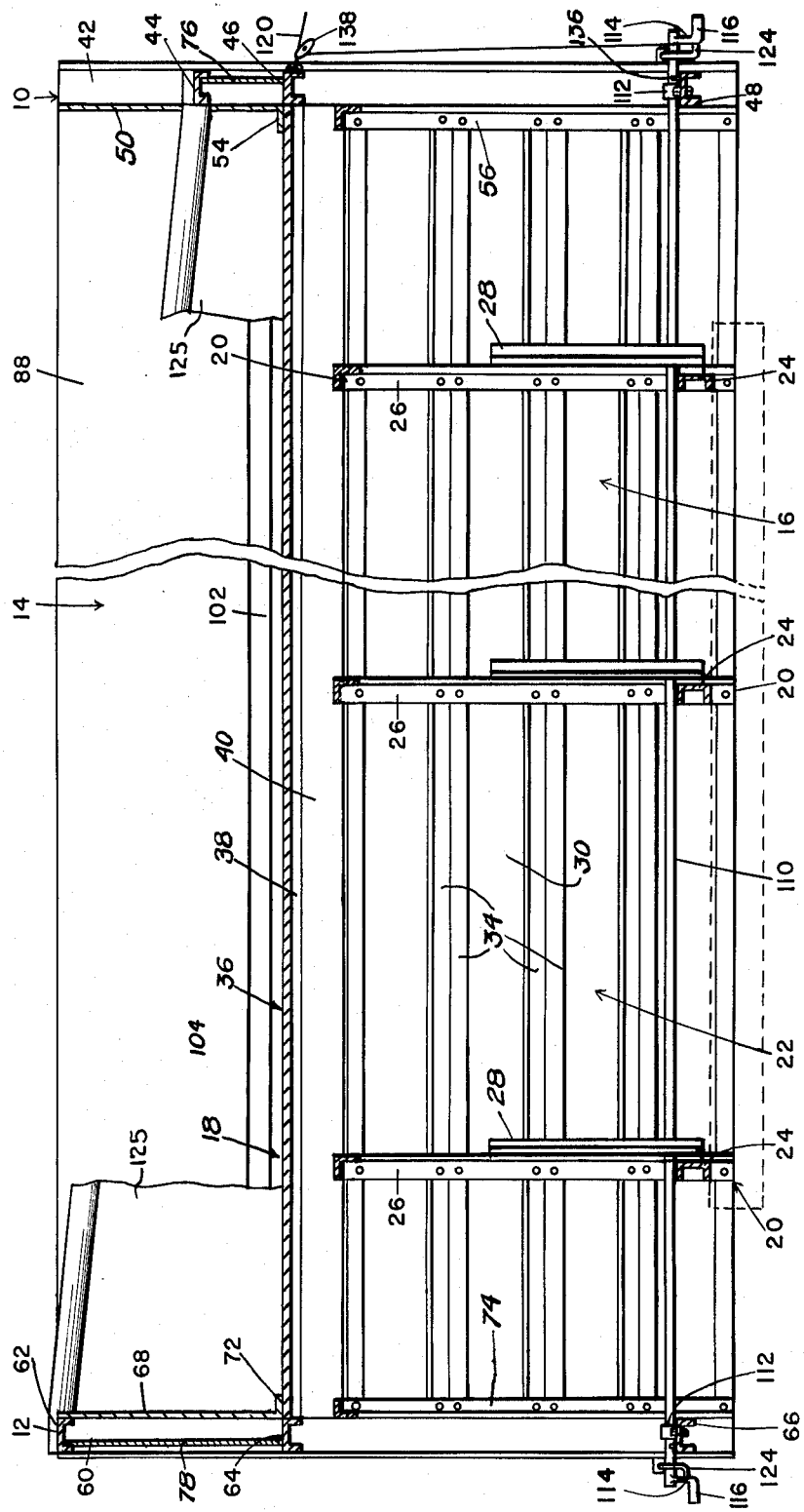

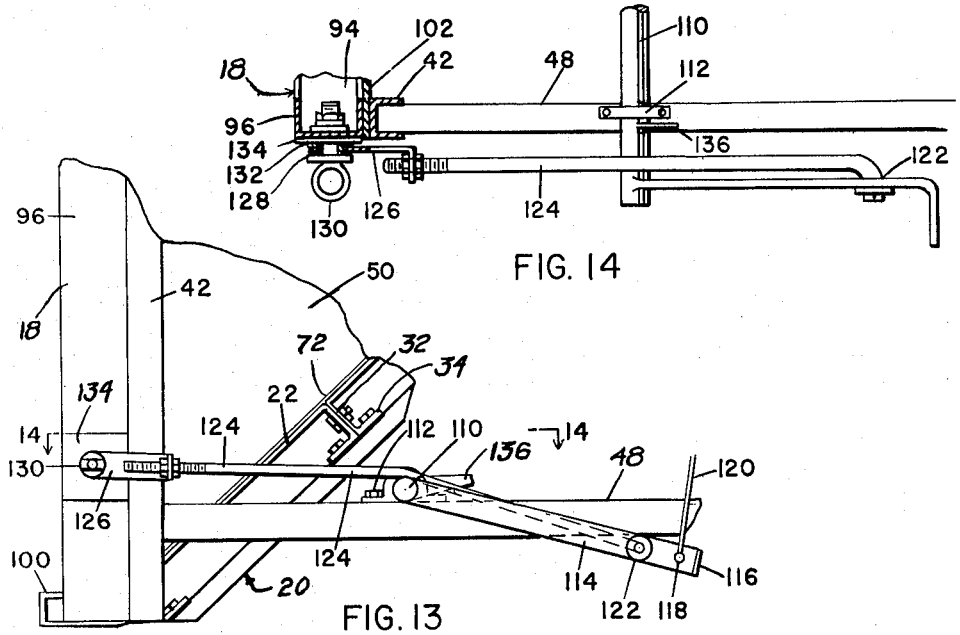
FIG. 14
FIG. 13
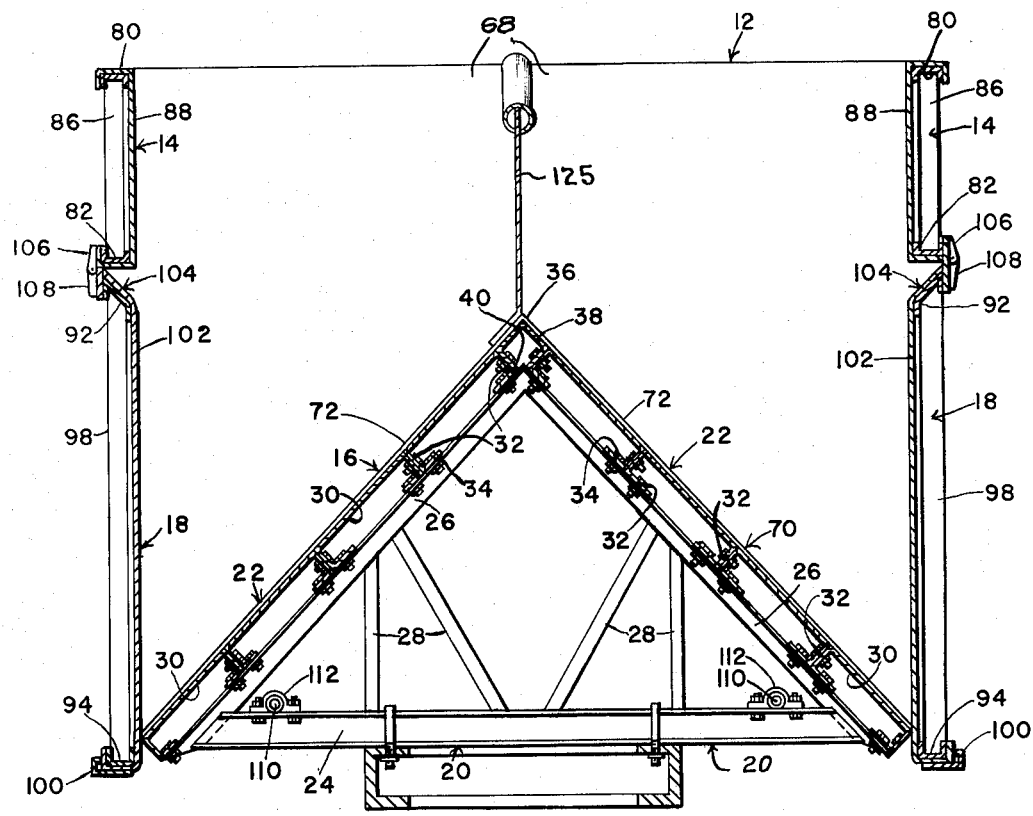
FIG. 6

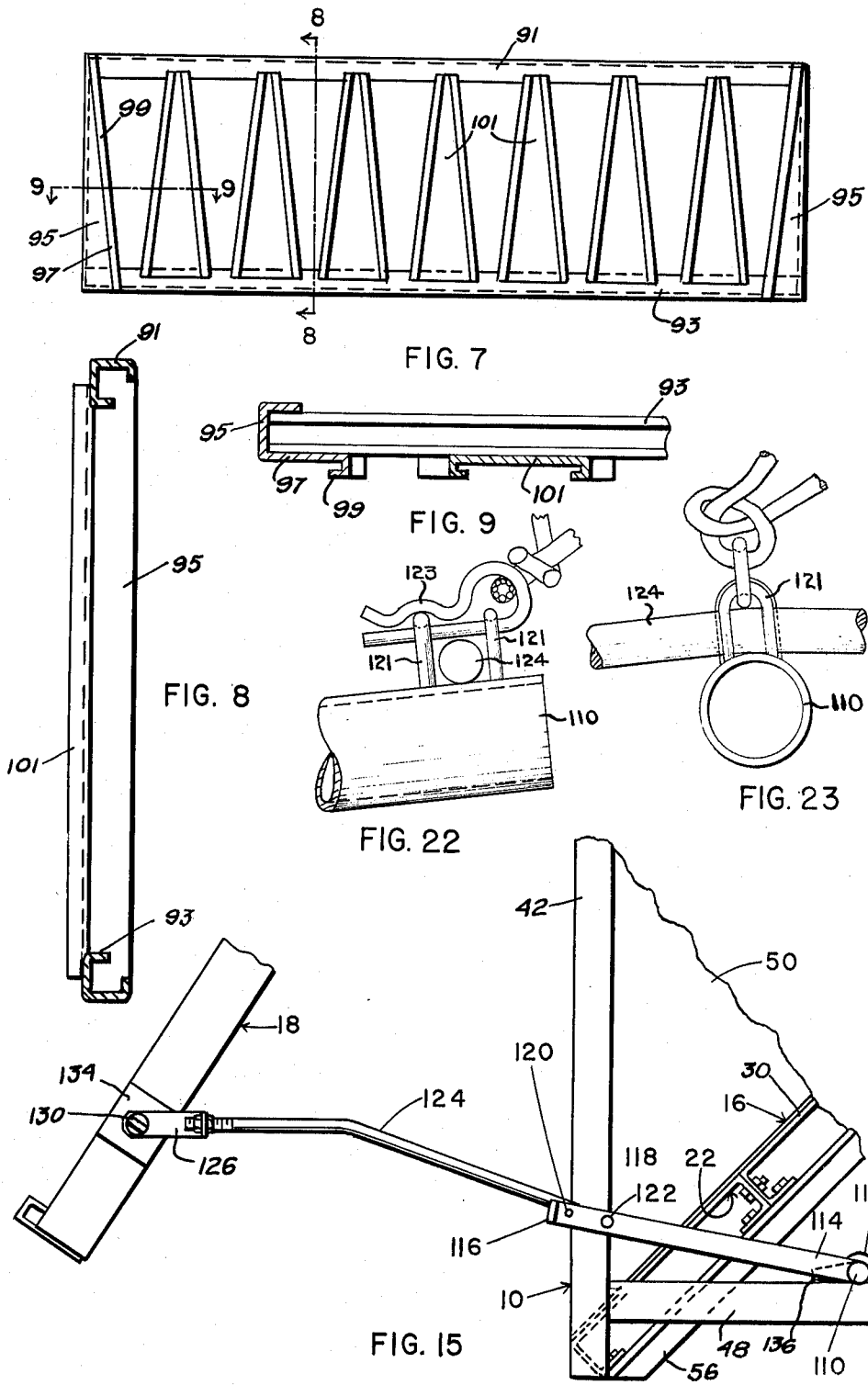

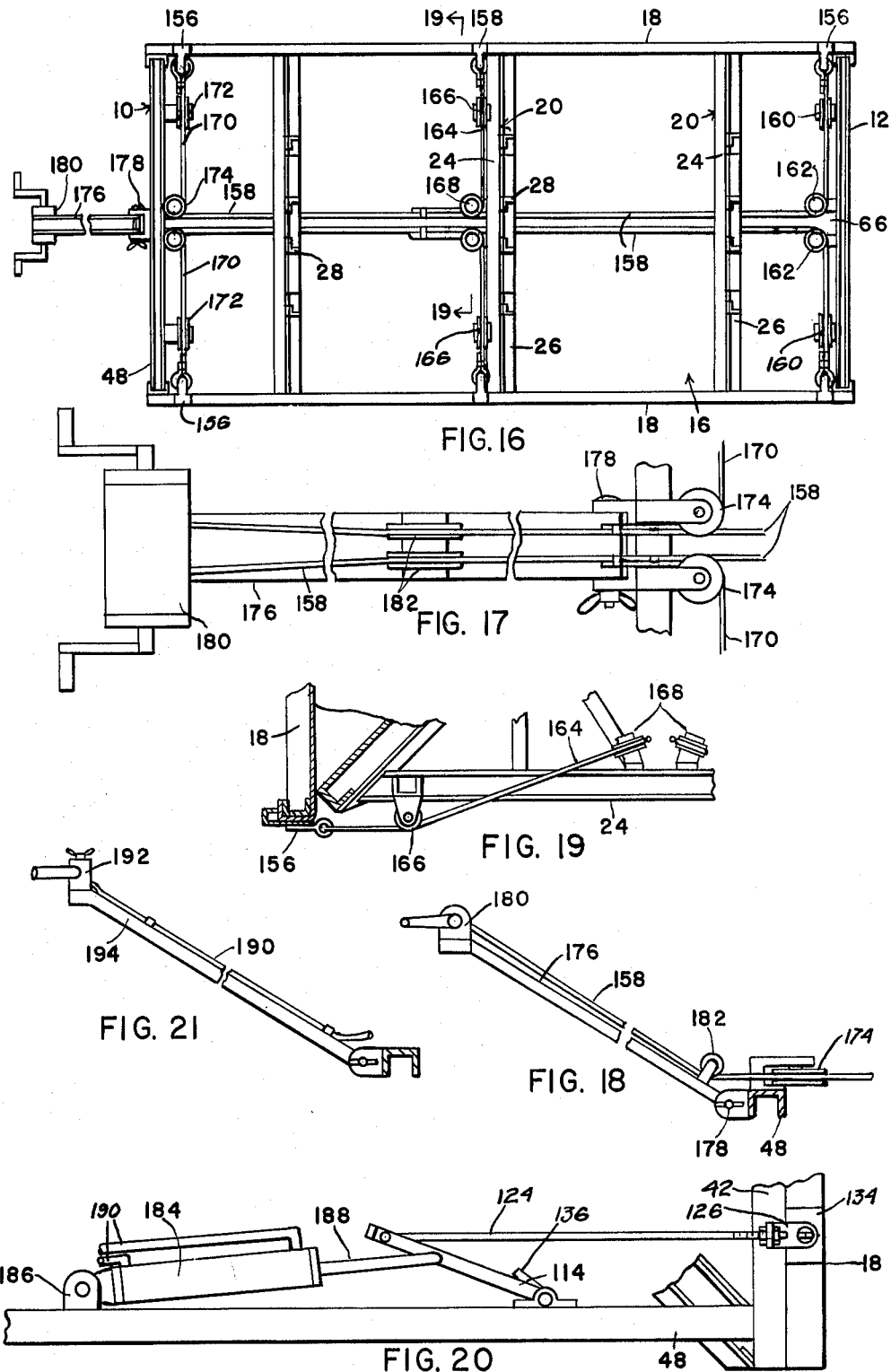

3,257,145
SIDE DISCHARGING VEHICLE BODY
Charles Z. Case, Avon, Guthrie B. Stone, Honeoye, and William F. Holmes, Springwater, N.Y., assignors to Stone Fabricators, Inc., Honeoye, N.Y., a corporation of New York
Filed Sept. 10, 1962, Ser. No. 222,307
2 Claims. (Cl. 296—14)

This invention relates to improvements in a side discharge vehicle body construction and particularly to a side discharge body for use on a trailer or the like.

An object of the invention is to provide a side discharge vehicle body particularly adapted to use on a farm, ranch or the like, in the connection with the feeding of farm animals in which the body is constructed with a compartment formed by the side, end and bottom walls in which the bottom wall is inclined toward the side edges of the body so as to discharge material contained in the body outwardly from the side thereof.

A further object of the invention is to construct the side walls to form an opening along the outer lower side edges of the body and have hinged doors mounted to have the lower edges swing outwardly into open position from a closed position engaged with the lower side edges of the body.

Another object of the invention is to provide a toggle latch mechanism on the bottom of the body connected with the lower edge of the doors and operable to hold and lock the doors in both open and closed positions.

Another object of this invention is to eliminate any and every time consuming operation preparatory to the discharge of the load at the point of storage such as dismounting from tractor or vehicle, removing pins, bars, catches, tailgates or panels, coupling sources of power, raising floors and the like. Similarly to eliminate all time consuming operations subsequent to discharge of the load such as replacing pins, bars, catches, tailgates or panels and uncoupling sources of power lowering floors and the like.

Another object of this invention is to effect virtually instantaneous discharge of a load directly into the spot of final storage thus eliminating the time of protracted discharge and any rehandling of the load.

Another object of this invention is to prevent or greatly reduce spoilage of silage by oxidization. A means is to shape the content of a wagon so that its maximum volume is derived from the maximum practical vertical measurement of the load thus ensuring maximum compaction by weight vibration during loading and transporting to destination.

A further object is to maintain this compacted and virtually oxygen free state by sliding it into storage by gravity with the least possible disturbance.

Another object of this invention is to prevent the doors from closing until discharge of load is complete.

The invention provides a vehicle body construction for use on farm trailers and the like in which transverse frame members carry the bottom wall of the body with portions of the bottom wall inclined downwardly from intermediate portions to the side edges of the body so as to discharge cattle feed or other suitable material contained in the compartment of the body outwardly from the sides of the bottom when hinged doors on the sides of the vehicle have their bottom edges swung outwardly into open position. The doors are operated to control the discharge of the material on the inclined bottom of the body by means of a lever mechanism in which a shaft is rotatably mounted on the bottom wall and carries radially extending operating levers on opposite ends beyond the end walls of the body. Adjustable connecting levers are pivotally connected to the lower edges of the hinged door and the free ends of the operating levers so the operating levers may be manually operated to move the doors in either open or closed positions. The levers operate as toggle levers so that when the hinged connection between the operating and connecting levers passes dead center position, the door will be held in open position and also in closed position when the levers are moved into a folded relation with respect to one another. By having the levers move past dead center position in both the open and closed positions of the door, they may be used to effectively lock the doors in both open and closed positions. A separate set of levers is used for each door where the body is provided with two doors, one at each side of the vehicle. Operating handles may be provided on the operating levers at the front end of the body for manual operation in moving the doors to open and closed positions. By connecting a flexible rope or wire to the operating handle on the operating lever and extending this rope or wire through pulleys mounted on the front end wall of the body, an operator of a tractor or truck towing a trailer carrying the body, constructed according to the invention, may operate the doors from closed to open position by pulling the rope or wire attached to the operating lever from a remote location on the truck or tractor. This provides a very convenient body construction for carrying cattle feed and other similar material from one point on a farm or ranch to another and conveniently discharging the material at a desired location.

The invention also provides for the use of the vehicle body as a feeder for cattle on a farm or the like in which the side doors for retaining the material in the body in cooperation with the inclined bottom wall and the end walls, is formed of a frame having a plurality of slats extending in upright relation mounted on the frame in spaced relation so that the doors may be kept in latched position. In the use of a door with the slat construction having spaces between the slats, the body may be filled with cattle feed and allowed to stand in the field or other feeding location for cattle so that they may secure the feed directly from the compartment in the body through the spaces between the slats in the doors. When the feed is substantially exhausted, the lever members may be operated to move the doors to open position so the compartment in the body may be cleaned before filling it with a new batch of material.

The invention provides a body construction having an inclined bottom formed of transversely extending frame members composed of substantially horizontal supporting members and inclined bottom wall bars. A plurality of bottom floor members are mounted in adjacent engaged relation on the bottom wall bars in which each floor member is formed of suitable sheet material having side flanges extending downwardly or laterally from a central floor forming section with the free edges of the side flanges secured to the bottom wall bars. The end walls and side walls are then secured to this bottom wall structure with the side walls terminating in spaced relation to both bottom side edges of the bottom wall to provide side discharge openings throughout the length of the side walls of the body. Doors hinged at their upper edge to the lower side edges of the side walls are swung into substantially vertical position for closing the open sides of the body and suitable toggle members are mounted on the bottom wall for manual operation to move the doors in closed and open position. By constructing the bottom with a plurality of floor members having floor forming sections and side flanges thereon secured to the bottom wall bars of the transverse frame members, the body can be constructed of sheet metal strips secured together in a manner in which a rigid inclined bottom construction for the body is provided which will effectively support the side and end walls with the hinged doors to provide a relatively cheap body construction for use particularly on a farm as a cattle feeder and also for conveying various types of farm materials from one location on the farm to another so it may be conveniently dumped by opening the side doors through operation of the lever mechanism.

The invention provides for the use of the vehicle body with the inclined bottom construction as a container for silage, hay and other materials which may be treated or cured by blowing warm or hot air through the material. For this purpose the floor members at the outer side edges of the body are formed of tubular conduit sections with the floor forming sections perforated so that the air forced into the tubular floor members through a conduit connection thereto will follow on through the perforations in the floor forming sections and upwardly through the material in the body compartment. The doors are retained in closed position for this curing or drying operation of the material therein. After the desired treatment of the material in the body by air circulation, the doors may then be opened for discharge of the material outwardly from the compartment in the body so that additional material may be placed in the compartment and correspondingly treated.

The invention incorporates a bottom floor construction for a vehicle body in which transverse frame members are mounted in spaced parallel relation between the opposite ends of the body and have a plurality of floor members made of sheet metal or the like formed into channel shape having flanged central floor sections and side flanges which may have the free edges turned inwardly to engage the transverse frame members. Suitable means are provided for attaching the flanges of the floor members to the transverse frame members which result in a rigid bottom wall structure for the vehicle body adapted to have the side and end walls mounted thereon by securing the end walls to the ends of the floor members with the side walls secured to the sides of the end members. In this way the body may be formed of a plurality of sheet metal members suitably secured together to form a light rigid body that is relatively cheap to construct for providing a vehicle body for a trailer or the like to be used on a farm and adapted to carry substantial quantities of cattle feed or other material to one point or another on the farm.

The present invention provides a light weight relatively simple sheet metal body construction adapted to be mounted on a trailer frame or the like so that it may be hauled about a farm, ranch or similar area loaded with materials of the character used on a farm or the like so that these materials may be transferred from one point to another and so that the body may also be used for either drying and curing cattle feed or as a cattle feeder in addition to its use for conveying and dumping material at various locations.

In the drawings:

FIG. 1 is a side elevation of the side discharge vehicle body constructed according to the invention.

FIG. 2 is a plan view thereof.

FIG. 3 is a front end view thereof.

FIG. 4 is a rear end view thereof.

FIG. 5 is a vertical longitudinal cross section taken substantially on the line 5—5 of FIG. 2.

FIG. 6 is a vertical transverse cross section taken substantially on the line 6—6 of FIG. 1.

FIG. 7 is a side elevation of the vehicle body illustrating the use of the slatted door construction.

FIG. 8 is a cross section taken substantially on line 8—8 of FIG. 7.

FIG. 9 is a cross section taken substantially on line 9—9 of FIG. 7.

FIG. 13 is an enlarged fragmentary front end view showing the lower left hand corner portion of the body to illustrate the lever mechanism for operating the door in closed position.

FIG. 14 is an enlarged fragmentary cross section taken substantially on line 14—14 of FIG. 13 for illustrating the lever mechanism and its mounting at one end of the body in plan view.

FIG. 15 is a view similar to FIG. 13 showing the door in open position.

FIG. 16 is a diagrammatic bottom plan view of the body showing a flexible cable mechanism connected to the bottom of the doors with a winch carried by a supporting arm at a distance in front of the body for remote operation by the operator of a tractor to pull the doors into closed position.

FIG. 17 is an enlarged fragmentary plan view showing the supporting arm, winch and mounting on the front of the body.

FIG. 18 is a side elevation of the supporting arm with the winch as shown in FIG. 17.

FIG. 19 is an enlarged fragmentary cross section through the body taken on line 19—19 of FIG. 17 illustrating details of construction of part of the cable mechanism and its mounting.

FIG. 20 is a fragmentary front view of the lower right hand corner portion of the body showing how a fluid cylinder is mounted on the body with the piston rod connected to the door operating lever mechanism for power operation of the door.

FIG. 21 is a view similar to FIG. 18 showing how forwardly extending supporting arm supports a fluid operating device for operating the piston in the cylinder shown in FIG. 20 for operating the door.

FIG. 22 is an enlarged detail view showing the front end of the operating shaft in side elevation equipped with a pair of loops for detachably mounting a retaining clip for holding the connecting levers in folded position with the door closed.

FIG. 23 is a view showing the construction illustrated in FIG. 22 looking from the righthand side.

Figure 10:
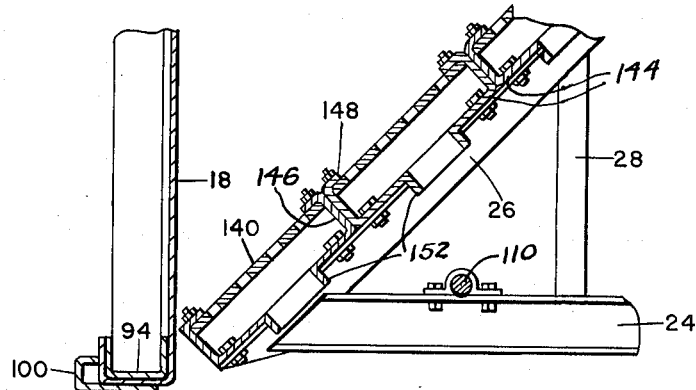
FIG. 10 is a detail of cross section taken through the outermost floor members on one side of the vehicle body showing how the outer floor member has had a tubular duct member inserted in place thereof and formed with a perforated floor section for use in discharging air through material contained in the compartment in the body.
Figure 11:
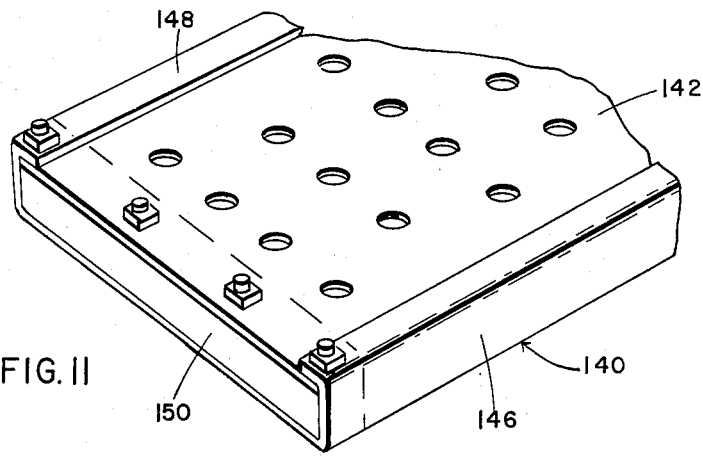
FIG. 11 is a fragmentary view showing the end of the floor member forming the air duct in perspective looking from above the outer end thereof.
Figure 12:
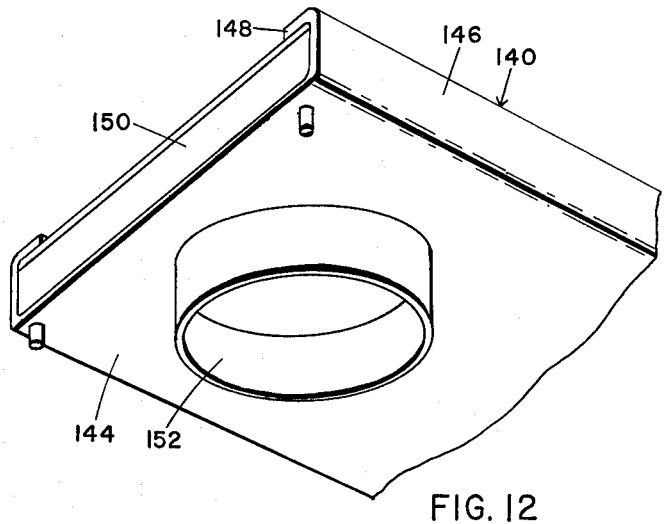
FIG. 12 is another view of the floor member forming the air duct showing a fragmentary portion of one end thereof in perspective looking at the lower side from a position outwardly beyond one end and at one side thereof.

The body constructed according to the invention has a front end wall 10, a rear end wall 12, side walls 14 and a bottom wall 16. The side walls 14 are secured to the upper side edges of the front and rear end walls 10 and 12 respectively, and the front and rear end walls 10 and 12 are mounted on opposite ends of the bottom wall 16 in a manner that will be hereinafter described in more detail. Doors 18 are provided, one for each side of the vehicle body. Each door 18 has its upper end hinged to the lower edge of the side wall 14 with the lower free edge of the door adapted to be swung inwardly and outwardly to and from the lower side edge of the bottom wall 16.

The bottom wall 16 is constructed of a plurality of transversely extending frame members 20 on which are mounted a plurality of floor members 22. Each transverse frame member 20 has a transverse frame bar 24 arranged in substantially horizontal relation at the bottom of the floor members to provide a supporting bar for supporting the body on the chassis of a trailer, truck or the like. A pair of bottom wall bars 26 have one end of each connected together by welding or the like, in substantially right angular relation, as shown for example in FIG. 6, to provide the central support for the ridge portion of the bottom wall.

The bottom wall bars 26 are inclined downwardly from the central portion of the body toward the outer side edges, as shown in FIG. 6, with the outer ends suitably secured by welding or the like to the free ends of the transverse frame bar 24. The free ends of the bottom wall bars 26 extend outwardly slightly beyond and below the ends of the transverse frame bar 24 in the manner shown in FIG. 6. A plurality of stress distributing bars 28 have their ends suitably welded or otherwise secured to intermediate portions of the transverse frame bar 24 and the bottom wall bars 26, as shown in FIG. 6, at opposite sides of the connection between the bars 26 so as to distribute the weight of the material in the body compartment through the floor members to the transverse frame bar 24 throughout the length thereof. This provides for a substantial equalization of the load carried by the body in its application to the transverse frame bar 24 and then to the chassis of the trailer or other vehicle on which the body is mounted.

The floor members 22 are formed of elongated sheet metal strips extending from end to end of the body and formed to provide the floor forming sections 30 having the side flanges 32 extending from opposite sides thereof downwardly and at substantially right angles thereto with the free edges turned inwardly to form the marginal strips 34 at the bottom edges of the floor members 22. The marginal strips 34 are formed in substantially spaced parallel relation to the floor forming sections 30 and have their outer surfaces engaged with the outer faces of the bottom wall bars 26, as clearly shown in FIG. 6. The floor members 22 are mounted in longitudinally extending relation from the front to the rear end of the body on the bottom wall bars 26 with the outermost floor member having the outer side flange 32 thereof located at the end of the bottom wall bar 26 at each side of the body, as shown in FIG. 6.

The floor members 22 have the marginal strips 34 bolted or welded to the bottom wall bars 26 to rigidly secure the transverse frame members 20 and the floor members 22 in assembled relation to form the bottom wall 16 of the vehicle body. A plurality of the floor members 22 are mounted in edge to edge engaged relation, as shown in FIG. 6, with the side flanges 32 of the adjacent floor members 22 engaged with one another and suitably secured together by bolts or in any other suitable manner throughout the length of the side flanges. In this way, the floor forming sections 30 of a plurality of the floor members 22 are arranged in inclined relation on the inclined bottom wall bars 26 so as to form a smooth inclined bottom wall extending between the opposite end walls of the body and inclining downwardly from the central portion of the body to the outer side edges so that material contained in the compartment in the body between the side and end walls will slide outwardly by gravity and downwardly beyond the outer side edges of the bottom wall. Where the bottom wall of the body is inclined downwardly and outwardly from the center portion to both side edges, as shown in FIG. 6, the floor members 22 will terminate in spaced relation with the side flanges 32 of the innermost floor members 22 in spaced relation and at substantially right angles to one another.

The invention provides a central ridge portion or central ridge floor member 36 mounted between the adjacent edges of the innermost floor members 22 over the intersection of the bottom wall bars 26, as clearly shown in FIG. 6. The central ridge portion or ridge floor member 36 has the floor forming sections 38 at opposite sides of the central portion thereof arranged in substantially right angular relation to form a ridge in the center of the bottom wall 16 with the floor forming sections 38 arranged to provide a smooth floor surface in alined relation with the floor forming sections 30 of the floor members 22. The central ridge portion 36 has the side flanges 40 formed along the outer edges of the angularly extending floor forming sections 38 engaged with the side flanges 32 of the floor members 22 so that the ridge floor forming sections 38 lie in substantially coplanar relation with the floor forming sections 30 of the floor members 22 and complete the structure of the bottom wall 16, so that the inclined surfaces of the bottom wall at each side of the body extend completely from the ridge in the central portion to the outer edges.

In the form of the invention as shown in the drawings, three transverse frame members 20 are used in the construction of the bottom wall 16 in which one of the frame members 20 is located in the central portion of the body and the other two transverse frame members 20 are located in positions spaced inwardly from the end walls of the body. All of the bar members forming the transverse frame members 20 are formed of sheet metal in either angular or channel shape in cross section so that when the floor members 22 are attached to the bottom wall bars 26 and to each other as herein above described, a rigid bottom wall 16 will be produced. By using sheet metal parts constructed as herein described for the formation of the parts of the bottom wall 16, a substantially strong, light weight and inexpensive construction is provided.

The transverse frame bars 24 are engaged with the chassis of a trailer or a truck in mounting the body on a suitable form of vehicle so that it may be transported from place to place. Any suitable conventional means may be used for attaching the portion of the transverse frame bars 24 to the chassis of the vehicle on which the body is mounted as may be found most desirable to firmly secure the body to the vehicle. This is indicated diagrammatically in the drawings in FIGS. 5 and 6 illustrating a portion of a vehicle chassis on which the body is mounted.

The front end wall 10 has the side bars 42 formed of sheet metal in channel shape with the flanges extending inwardly. A top channel bar 44 has its flanges extended downwardly and opposite ends welded or otherwise rigidly secured to the upper end portions of the side bars 42. The ends of the top channel bar 44 are engaged between the flanges of the side bars 42 and spaced a short distance below the upper ends to leave the front end of the body above the top channel bar 44 open. An intermediate channel bar 46 is mounted in substantially horizontal relation and extends in substantially parallel relation to the top channel bar 44 below the channel bar 44 and has opposite ends engaged between the flanges of the side bars 42 and rigidly welded or otherwise secured thereto. A bottom channel bar 48 has the end portions engaged between the flanges of the side bars 42 of the front end wall 10 and rigidly welded or otherwise secured thereto. A rigid front end wall frame construction is provided by the top, intermediate and bottom channel bars secured to the channel shaped side bars 42 in the manner herein above described.

A pair of sheet metal front end wall sections 50 have the upper edge engaged with the inner flange of the top channel bar 44, the outer side edges engaged with the inner flanges of the side bars 42 and the intermediate portions engaged with the intermediate channel bars 46 and suitably welded thereto to form a closed front end wall construction. The inner lower edges of the front end wall sections 50 are inclined at the same angle as the inclination of the inner floor surface of the floor members 22, as indicated by the numeral 52. These inclined edges of the front end wall sections 50 are arranged so that the lower outer edge extends from the side bars 42 inwardly and upwardly to the intermediate channel bar 46. The inclined edges 52 of the front end wall sections 50 are formed by the inwardly extending flanges 54 which engage over the upper surface of the floor forming sections 30 of the floor members 22 and the floor forming sections 38 of the central ridge floor member 36. These inwardly extending flanges 54 are suitably bolted or welded to the ends of the floor forming sections 30 and 38 and cooperate to rigidly attach the front end wall 10 to the bottom wall 16. A pair of front angle bars 56 have one flange of each bar engaged with the marginal strips 34 of the floor members 22 in inclined relation at opposite sides of the bottom wall 16 at the front ends of the floor members. These front angle bars 56 extend from the central ridge portion of the bottom wall 16 downwardly and oppositely in opposite directions to the outer side edges of the bottom wall and have the outer lower ends bolted or otherwise attached to the inner flanges of the lower bottom channel bars 48 for further and rigidly securing the front end wall on the bottom wall of the body structure.

The rear end wall 12 of the body as found in FIGS. 4 and 5, for example, has a pair of side bars 60 formed of channel shape in cross section with the flanges extended inwardly at each side thereof. These side bars 60 are connected together in spaced parallel relation by top channel bar 62 having its opposite ends extended between the flanges at the upper ends of the side bars 60 and suitably and rigidly mounted or bolted thereto. An intermediate channel bar 64 extends between the side bars 60 at a position just above the ridge of the bottom with opposite ends mounted or suitably secured between the flanges of the side bar 60. A bottom channel bar 66 has the opposite ends welded, bolted, or otherwise suitably secured to the lower ends of the side bars 60. Each of the top, intermediate and bottom channel bars 62, 64, and 66 respectively, extend in substantially parallel horizontal relation between the substantially upright side bars 60 and form a rigid rear end frame construction for the vehicle body.

The inner surface of the rear end wall 12 is covered with sheet metal wall sections 68. Each sheet metal wall section 68 has the upper marginal portion suitably secured by welding or the like to the inner surface of the top channel bar 62. The outer marginal surface of each wall section 68 is engaged with the inner surface of a side bar 60 and suitably welded or otherwise secured thereto. The outer margin of each wall section 68 extends substantially throughout the entire length of each side bar 60 and the inner edges extend to the central portion of the frame forming the rear end wall and terminate in adjacent relation. The bottom edges of each sheet metal wall section 68 are inclined as indicated by the numeral 70 at the same angle as the adjacent surface of the bottom wall 16. The wall sections 68 each have an inwardly extending flange 72 along the inclined edge 70 for seating engagement on the upper surface of the floor forming sections 30 and 38 of the floor members 22 and the ridge floor member 36, respectively. The inwardly extending flanges 72 are suitably bolted or otherwise rigidly secured to the ends of the floor forming sections 30 and 38 for rigidly securing the rear end wall 55 to the bottom wall 16.

A pair of rear angle bars 74 are mounted with one flange engaged with the end of the inwardly extending strip portions on the floor members 22 and extend in angular relation to each other on each side of the bottom wall from the ridge portion to the outer side edges. These bottom channel bars 74 are rigidly secured to the marginal strips 34 of the floor members 22 at the rear ends thereof and the side flanges of the angle bars 74 are also secured to the bottom channel bar 66 against the inner surface thereof and to the lower ends of the side bars 60. A rigid attachment of the rear end wall to the bottom wall 16 is provided by the rear angle bars 74 having the bottom channel bar 66 and the side bars 60 thereof secured thereto at the bottom outer edges of the bottom wall 16 and with the inwardly extending flanges 72 secured to the floor members 22.

Where the front end wall sections 50 and rear end wall sections 68 are made in more than one piece it is preferable to form them so that two duplicate sheets may be used with one section on one side and the other section on the other side of the end wall with the two sections having inner edges meeting at the central portion of both the front and rear end wall frames. These adjacent ends of a pair of end wall sections for both the front and rear end walls will meet between the upper and intermediate channel bars. A short upright channel bar 76 is used in the front end wall between the top channel bar 62 and the intermediate channel bar 64 for attaching the inner edges of the two sections 50 forming the wall sections together and with the channel bars 66 welded at opposite ends to the top and intermediate channel bars forming the frame for the front end wall. A similar short upright channel bar 78 of greater length than the bar 76 is used in the central portion of the rear end wall to secure the adjacent edges of a pair of sheet metal wall sections 68 together at the center portion of the rear end wall.

These end wall sections are suitably welded or otherwise rigidly secured to the short upright channel bar 78 which is in turn welded to the central portions of the upper and intermediate channel bars 62 and 64, respectively. With this construction of the front and rear ends, it will be noted that the rear end is closed to the top of the side bars 60 as distinguished from the upper portion of the front end being open between the upper ends of the side bars 42. Both of the end walls 10 and 12 respectively, are open in lower central portion by reason of the angular edges 52 and 70 respectively, of the front and rear end walls. This provides an opening between the side bars 42 and 60 respectively, of the front and rear end walls 10 and 12 respectively, below the bottom wall 16 to provide access to the underside of the bottom wall and to the transverse frame members 20 and the transverse frame bars 24. At the same time the channel bars forming the side bars and top, intermediate and bottom channel bars of both the front and rear frame bars cooperate with the wall sections at the opposite ends of the bottom wall 16 to provide a rigid end wall structure for the body at the ends of the bottom wall having stress distributing cooperation with the bottom wall.

A pair of side walls 14 are mounted along opposite sides of the body above the side edges of the bottom wall 16 and have the ends attached to side bars 42 and 60 at the front and rear ends of the body respectively, on each side thereof. The side walls 14 enclose only the upper or top portion of the compartment in the body between the upper ends of the end walls and leave the entire side of the body from a point at about the position of the intermediate channel bars 46 and 64 open to the lower outer edges of the bottom wall 16. This provides a means for discharging the material in the compartment in the body downwardly and outwardly from the sides of the body below the lower edges of the side walls by gravity through the material sliding down the inclined surfaces of the bottom wall 16.

Each side wall is constructed with a top channel bar 80 and a spaced parallel bottom channel bar 82. These channel bars 80 and 82 are each formed from sheet metal having the side edges of a strip of metal bent upwardly into channel shape. The top channel bar is mounted so the side flanges extend downwardly and the bottom channel bar has the side flanges extending upwardly. These channel bars are mounted in spaced parallel relation by the upright end bars 84 which receive the ends of the top and bottom channel bars 80 and 82 respectively, between the side flanges thereon for welding or other suitable means of rigidly securing the bars together in assembled relation. A plurality of intermediate upright bars 86 have their ends extending in spaced parallel relation to each other in spaced positions parallel to the upright end bars 84 with the end portions engaged between the side flanges on the top and bottom channel bars 80 and 82 to which they are rigidly secured by welding, or the like. This provides a rigid side frame structure for the vehicle body.

A side wall section 88 is formed of a size to engage over one side of the frame member with the marginal portion extending in engaged relation with the flanges of the top and bottom channel bars 80 and 82 and of the upright end bars 84, respectively. The upper and lower edges of the side wall section 88 are formed to engage about the top and bottom channel bars 80 and 82 respectively, with these marginal portions secured to the top and bottom channel bars 80 and 82 and the upright end bars 84 by means of welding, or the like. This provides a rigid stress distributing side wall structure formed of sheet metal parts to provide a side wall construction that is light and yet has substantial strength and rigidity to support the load carried in the compartment of the body and distribute stresses between the end walls for effectively retaining the end walls, the bottom walls, and the side walls in rigid body forming relation.

A pair of doors 18 are provided to extend between the front and end read walls 10 and 12 respectively, and close the space between the lower edge of the side walls 14 and the lower side edges of the bottom wall 16. One door is arranged at each side of the body. Each door 18 has a top channel bar 92, a bottom channel bar 94 and the upright end bars 96 with the ends of the top and bottom channel bars 92 and 94 respectively, engaged between the flanges of the upright end bars 96 and rigidly secured together by welding or the like, to form a rigid rectangular frame. This frame is the size of the opening in the side of the body between the outer edges of the front and rear end walls, the lower outer edge of the bottom wall and the lower edge of the side walls. A plurality of upright connecting members 98 are mounted in spaced parallel relation between the upright end bars 96 and have their opposite ends welded or otherwise secured to the top and bottom channel bars 92 and 94, respectively. The upright connecting members 98 are in the form of channel bars formed of sheet metal, as are the top and bottom channel bars 92 and 94 and the upright end bars 96. These several bars form a rigid rectangular frame for each door.

A supplemental bottom channel bar 100 has the edges of the flanges welded or otherwise secured to the outer flange of the bottom channel bar 94 with opposite ends terminating in spaced relation from the upright end bars 96. This supplemental bottom channel bar cooperates with the bottom channel bar 94 to rigidly hold the bottom edge of the door in position against outward flexing movement of the central portion relative to the end portions thereof. A sheet metal wall section 102 has a size equal to the size of the door frame with the upper and lower edges provided with extensions to extend around the top and bottom channel bars 92 and 94 to which the wall section 102 has its marginal portions rigidly secured by welding, or the like. The wall section is also welded or suitably secured to the upright end bars 96 and also to the upright connecting members 98. This provides a door for closing the bottom open side of the body in which the wall sections 102 cooperates with the several channel bars, the end bars and the upright connecting members to form a rigid stress distributing door structure for the body.

The top channel bar 92 is formed so that the central portion between opposite side flanges is inclined from the outer upper edge of the door to the inner side of the door so as to form a beveled upper edge along the top edge of the door, as indicated by the numeral 104. It will be noted that the intermediate upright bars 86 of the frame member forming side walls 14 are in alined relation with the upright connecting members 98 of the door frame construction and that the upright end bars 96 of the door frame are alined with the upright end bars 84 of the side wall 14.

Each door is hingedly connected to the lower portion of the frame forming the side wall 14. For this purpose, a plurality of hinges are provided which have the side sections 106 welded to the intermediate upright bars 86 and the upright end bars 84 in spaced relation between opposite ends of the side wall. Each side hinge section 106 is formed of sheet metal having a central portion and a pair of flanges extending outwardly from opposite sides of the central portion with the ends of the flanges at opposite sides formed with apertures to receive a hinge pin. The central portions of the side hinge sections 106 are welded to the bottom channel bar 82, the upright end bars 84 and the intermediate upright bars 86 respectively, to rigidly secure the side hinge sections to the side wall 14. The outer portions of the hinge for the door includes a door hinge section 108. Each door hinge section 108 is formed of sheet metal and has a central portion with the side flanges in spaced parallel relation arranged so that one end of the side flanges formed with an aperture to receive a hinge pin will slidably extend between the side flanges at one end of a side hinge section 106. The central portion of each door hinge section is suitably welded or otherwise attached to the upper end portions of the upright end bars 96, the upright connecting members 98 and the outer flange of the top channel bar 92 respectively, with the apertures receiving the hinge pin for connecting each door hinge section with its interengaged side hinge section 106 and 108 respectively, in a position spaced outwardly beyond the outer flanges at the bottom of the side wall 14 and the top of the door 18. The lower inner margin of each door 18 engages the outer edge of the outer floor member 22 in closed position for closing the opening in the bottom side portions of the body to retain material in the compartment formed within the body between the side and end walls and the doors. Each door may be independently swung outwardly on its hinged mounting so the lower edge moves away from the lower side edges of the bottom wall for discharging the material at each side of the compartment.

Suitable lever mechanism is provided for moving the doors between open and closed positions. Each door is operable independently of the other. The door operating mechanism for opening and closing each door and locking it in its open and closed positions has an operating shaft 110 extending longitudinally through the bottom of the body and projecting outwardly beyond the front and rear end walls 10 and 12, respectively. The operating shaft 110 is mounted for rotation on top of the transverse frame bars 24 inside of the bottom wall bars 26 and retained in position by the bearing clips 112. The opposite ends of each operating shaft 110 are positioned in outwardly extending relation beyond the front and rear end walls 10 and 12, respectively. The outer ends are retained by the bearing clips 112 mounted on the bottom channel bar 48 at the front of the body and the bottom channel bar 66 at the rear end of the body. The free end portions of the operating shaft 110 extending beyond the front and rear end walls has an operating lever 114 rigidly secured thereto at one end and the opposite end projecting radially outwardly therefrom.

The outer free end of the operating lever 114 at the front end of the body is formed with an operating handle 116 and adjacent this handle 116 is formed with an aperture 118 for receiving the end of an operating line or rope 120 so that the operating line may be firmly secured to the operating lever. The outer end portion of each operating lever 114 has a pivot bearing 122. A connecting lever 124 has opposite ends bent in obtuse angular relation on opposite sides of the operating shaft 110 with the inner end formed in angular relation to pivotally engage in pivot bearing 122 to provide a toggle lever in combination with the operating lever 114. The outer end of the connecting lever 124 is adjustably connected to the connecting section 126 forming part of the connecting lever 124 which has the outer end formed with an aperture rotatably mounted on a pivot spacer sleeve 128. The inner end of the connecting section 126 is extended laterally and formed with an aperture to receive the outer end of the connecting lever 124 having the end threaded for receiving a pair of nuts for adjusting the position of the connecting section 126 on the connecting lever 124 to vary the length of the lever between the pivot connection at the inner end in pivot bearing 122 and the pivot connection at the outer end on the pivot spacer sleeve 128.

The pivot spacer sleeve 128 is secured to the lower outer end portion of an upright end bar 96 by the pivot bolt 130 extending through the sleeve 128 and the aperture in the connecting section 126 rotatably receiving the sleeve with the inner end of the pivot bolt 130 extending through an aperture in the upright end bar 96 where the inner threaded end of the pivot bolt threadedly receives a nut, lock washer and bearing washer for engaging the inner face of the upright end bar. The pivot bolt 130 has a shoulder at the outer end and a bearing washer adjacent to the shoulder for engaging the outer end of the pivot spacer sleeve 128 for holding the inner end of the spacer sleeve 128 against a bearing washer 132 for engaging the bearing plate 134 mounted on the lower outer face of the upright end bar 96.

When the nut threaded on the pivot bolt 130 is turned into tight position on the bolt to draw the shoulder and bearing washer engaging the outside of the pivot spacer sleeve 128 into positon to rigidly engage the outer face of the bearing washer 132, this washer will be held in tight bearing engagement with the outer face of the bearing plate 134 suitably secured by welding or the like to the outer face at the lower end of the upright end bar 96. This provides a rigid bearing assembly in which the connecting section 126 has free rotation on the pivot spacer sleeve 128 in the operation of the connecting and operating levers to move the door from closed to open position.

As above indicated the operating shaft 110 has an operating lever 114 on each end thereof. Each operating lever 114 has a separate connecting lever connecting the operating lever with the end of the door in the manner described above so that a pair of operating levers is arranged for operation in the rotation of the operating shaft 110 to move the lower end of the door 18 outwardly and inwardly relative to the lower outer side edge of the bottom wall. The door may be operated between open and closed positions by manually grasping the operating handle 116 and rotating the operating shaft 110 with the operating levers 114 thereon from an inwardly extended position of the levers 114 to an outwardly extended position thereof in moving the door from closed to open position where the operating levers 114 will be extended outwardly in substantially alined relation with the connecting levers 124.

When the pivot bearing connection 122 between the operating levers 114 and the connecting levers 124 extends past a plane intersecting the center of the operating shaft 110 and the center of the pivot bolt 130, the pivot bearing 122 will move past dead center position. A stop means or stop projection 136 has one end rigidly attached to operating shaft 110 in line with a portion of the bottom channel bars 48 and 66 respectively, of the front and rear end walls 10 and 12 respectively, so that when the pivot bearing 122 extends slightly beyond the line or plane in which the shaft 110 and the pivot pin 130 lie, the stop projection 136 will engage the bottom channel bar and limit further rotation of the shaft 110. This provides a means of locking the connecting levers 124 and the operating levers 114 in position to retain the door open.

The operating handle 116 may then be manually operated in a reverse direction to move the lever 114 into folded relation with respect to the connecting lever 124. The operating lever 114 is moved from an outwardly extending position when the door is open to an inwardly extending position when the door is closed. By moving the operating lever 114 from its outwardly extending position upwardly and inwardly to an inwardly extending position, the operating levers at opposite ends of the operating shaft 110 will move the open door into closed position against the outer edge of the bottom wall 16 and the outer faces of the sides of the front and rear end walls 10 and 12, respectively.

The length of the connecting lever 124 and the connecting section 126 at each end of the body is adjusted so that when the corresponding operating levers 114 are moved into inwardly extending position, the inner face of the door about the marginal portion thereof will engage the end walls and the bottom wall. When the operating levers 114 are rotated into positions so that the plane passing through the pivot bearing 122 and pivot bolt 130 is below the center of the shaft 110, the levers will cross at dead center position until the bend between the angular portions of the connecting lever 124 engages the operating shaft 110. In this position the operating and connecting levers will pass dead center position and move into a locked position for drawing the lower end of the door into firmly closed position where it will be locked against outward movement until manually operated by operation of the levers 114 through engaging and moving the operating handle 116 upwardly and outwardly.

The door at one side of the body is independently operated from the door at the other side of the body by means of the operating shaft 110, the operating levers 114 and the connecting levers 124. A separate set of operating levers and a separate operating shaft is provided for each door, each set at one side of the bottom of the body constructed and operating in the manner above described.

When the body constructed in accordance with this invention is mounted on a trailer chassis for use on a farm in moving feed materials from a barn to a field or the like, for feeding farm animals, it is usually hooked up to a tractor or truck and towed from one location to the other. When the vehicles arrive at the desired location where the feed or other material in the body is to be dumped, it is more convenient under some conditions to have means for remotely operating the operating levers 114 to open the door at either one or both sides of the body. For this purpose the flexible operating line or rope 120 is attached at one end to the handle 116 of the operating lever 114 at the front end of the body. This operating line 120 extends over a guide pulley 138, there being a guide pulley for the operating line from the operating lever on each side of the body so the operating lines 120 from each pulley may be extended forwardly to the tractor or truck towing the trailer mounted to the body. The guide pulleys 138, one for each line 120, are mounted on the intermediate channel bar 46 on the opposite ends thereof, as shown in FIG. 3, for pivotal movement. The operating lines 120 extend from these pulleys forwardly so the tractor or truck operator can tie the free ends to a convenient location on the truck near the driver's seat.

When the desired location for dumping the material in the body is reached, the truck operator can pull the lines 120, or either of them, and move the operating levers 114, or either of them, to open one or both sides of the body by moving the doors to open position. The guide pulleys 138 are located directly over the positions for the operating shafts 110 at each side of the body. When the operating line 120 for an operating lever 114 is pulled by the operator of the tractor from a location remote from the body, the operating lever 114 may have the handle 116 moved into a position above the operating shaft 110 with the operating lever 114 extending upwardly from the operating shaft 110.

When a side member is moved to the partially open position with the operating levers 114 in a vertical position, the material within the compartment in the body will then force the door on one or both sides toward a full open position in the downward outward movement of the material through the open side of the body. It is found that the door will frequently be moved to the full open position in which the operating levers 114 and the connecting levers 124 will be moved into the open locked position past dead center for locking a door which has been released in full open position. The truck or tractor operator in cases where a door or both doors are moved to the full open position by the material leaving the compartment in the body can then again operate the operating levers 114 toward closed position by pulling on the operating line 120. As the operating levers are moved toward vertical position over the operating shaft 110, the weight of the door swinging toward closed position will cause movement of the operating levers toward closed position to an extent sufficient to have the operating levers moved into a substantially horizontal position where the door will be held in closed position due to the folded relation of the levers extending inwardly beyond the operating shaft 110. If the operating levers 114 and the connecting levers 124 are properly adjusted, the operating lever will move into the locked closed position retaining the door in closed position without having to be manually forced toward the dead center position. When properly adjusted these operating and connecting levers may be effectively controlled and operated by the operating line 120 from a remote location to open and close the side doors on the body in transporting and dumping the material contained in the body in a convenient manner.

The front end of each operating shaft 110 is provided with a pair of spaced inverted U-shaped holder members 121 shown in FIGS. 22 and 23, for receiving the connecting lever 124 between them when the lever 124 is in the folded position for holding a door in closed position. The ends of the members 121 are welded to the operating shaft 110 as shown in FIGS. 22 and 23 close to the front end. A spring retainer clip 123 formed of a piece of spring wire has the wire folded to provide a loop portion and the two ends lying adjacent each other to engage about opposite sides of the holder members 121. One of the ends is formed with an outwardly extending bent portion and the terminal portion beyond the bent portion extending in angular relation away from the other leg portion. When the clip 123 is applied to engage the legs about opposite sides of the members 121, the terminal portion facilitates sliding the clip in position on members 121 and the bent portion cooperates with one of the members 121 and the other leg portion to detachably retain the clip engaged with the members 121. The lever 124 will be prevented from moving toward door opening position when the clip 123 is engaged with holder members 121.

The doors may be opened by the operator from the remote location as above described by tying the operating line 120 to the loop portion of the retainer clip 123 in advance of the guide pulley 138. Then, when the operator on the tractor pulls the line 120, the clip 123 is first detached from holder members 121. Further pulling the line 120 will then operate the operating lever 114 as above described.

The construction shown in FIGS. 7 to 9 inclusive shows a modified form of door construction for substitution for the doors 18 when it is desired to use the body for a cattle feeder. This cattle feeding door has a top channel bar 91, a bottom channel bar 93 and upright end bars 95 to form a rectangular door frame the same size as the door 18. The upright end bars 95 are formed to provide a front plate portion 97 extending over the front of the top and bottom bars 91 and 93 and formed to be substantially wider at the bottom than at the top. The inner side edge of the plate portion 97 is formed with a return bend or rolled portion 99. A plurality of retainer plates 101 are formed so they are wider at the bottom than at the top to provide side margins tapering toward each other from the bottom toward the top. These retainer plates 101 are formed with return bends or rolled side margins, as shown in FIG. 9. The retainer plates 101 extend in spaced relation to each other, and have the top and bottom ends secured to the top and bottom channel bars 91 and 93 respectively, to form a plurality of openings in the door. These openings are narrow at the lower portion of the door and widen toward the top portion thereof for cooperation to retain cattle feed in the body on the inclined bottom wall and at the same time provide openings so cattle may eat the food through the openings. This feed door will be retained in closed position while the feed is being eaten. It will be used otherwise in the same manner as the door 18 which it replaces and may be swung outwardly whenever it is desired to dump the remaining food and clean the body. The top channel bar 91 will be provided with high members similar to the door 18. The lever mechanism will be attached to the ends of the cattle feed door in the same manner as described in connection with the door 18.

The body built in accordance with the present invention as herein after described is also useful for treating material of various types where it may need drying or curing, such as hay or silage. For this purpose, the outer floor member 22 at each side of the bottom wall 16 will be removed from the bottom wall bars 26 and replaced by another floor member having a modified construction to form an air duct 140. The floor member air duct 140 will have a floor forming section 142 similar to the floor forming section 30, but in which the floor section 142 is provided with a plurality of perforations throughout the length and width of the floor forming section.

A bottom closure sheet or plate 144 has outwardly extending side flanges 146 formed at the outer edges with marginal strips 148 extending inwardly toward each other. The floor section 142 has opposite margins overlapping the marginal strips 148 to which they are secured in any desired manner to form an elongated tubular casing providing the air duct. The end plates 150 are secured to the ends of the floor forming sections 142, and the side flanges 146, the marginal strips 148 and the bottom closure sheet or plate 144 to seal the ends of the floor forming section 142 in forming a closed air duct so that air within the floor forming section will pass outwardly through the perforations therein for movement upwardly into the compartment in the body. The bottom closure plate 144 has a tubular fitting 152 mounted in one end portion thereof about an aperture formed therein to form a connection for a flexible hose so the floor member, or the air duct 140 may be connected to a suitable air circulating pump or blower.

The floor member 140 is mounted on the lower outer ends of the bottom wall bars 26 in the same manner as the floor members 22 are mounted thereon so the outer floor members 22 and the air duct floor members 140 are interchangeable with one another. With the air duct floor members mounted on the bottom wall at the outer side edges thereof, it will be understood that air may be blown through material carried in the compartment in the body above the bottom wall for forcing it through the apertures in the floor forming sections 142. With the doors 18 retained in closed position this air will be forced upwardly through hay, silage or other material filling the body so that when the air is heated it will affect the drying or curing of the material in the body in a desired manner. In this way food for farm animals may be cured by air or heated air in the compartment in the body and where it is desired to heat the food for farm animals this may also be done in a manner that will be clearly understood from the above description.

It will be understood that other floor members 22 may be removed and replaced with the air duct floor members 140 in case it is desired to use more than one air duct member at each side of the bottom or where it is desired to use the air duct member 140 in a position spaced inwardly from the side edge of the bottom. Two or more air duct members may be used interchangeably with the floor members 22 where it is found desirable to do so in treating the material contained in the body compartment.

The body construction for use on trailers or trucks about a farm for carrying materials of various sorts including food for farm animals, discloses some of the uses which may be made from the construction herein above described and illustrated with regard to one particular desired from of construction. Several different uses for the invention are disclosed in which the slotted doors may be used in place of the doors 18 so that farm animals may obtain food through the slots in the door from the compartment in the body. Otherwise, the body may be used for aerating and heat treatment of material contained in the body which may be subsequently dumped from the body by moving the doors to open position. Various other material may be loaded into the compartment in the body and hauled from one location to another and discharged outwardly from one side or another or from both sides through the operation of the doors from closed to open positions either through manual operation of the operating handles 116 or by remote operation of the operating levers 114 through operation of the operating line 120.

A particularly advantageous application for the body construction forming the present invention is its use for handling and curing silage. With the present body construction a farmer can use a chopper with a blower for receiving hay or corn as it is picked from the rows in the field by the conventional equipment moving along the rows. The chopper will chop the hay or corn into the desired size for making silage and the blower will blow the chopped material into the body provided by this invention. When the body is filled with this silage material it is towed to a suitable location where a heater with a blower may be connected to the body using at least two of the duct members for processing the material to the desired extent. The material will be piled high in the body. When it is towed from the field to the silo the material will be packed down into more compact form by the vibration of the body while being towed.

The present body construction enables the farmer to use a trench type silo. A trench silo consists of providing an elongated excavation in the ground at a desired location and providing a concrete lining for the excavation with the side walls sloping upwardly from the bottom to the ground level. The ends are also inclined so a tractor can tow the body of the present invention filled with cured silage into the trench silo and then open the doors and dump the material into the silo. This operation is repeated until the trench silo is filled. The tractor will pull the trailer with the present body over the top of silage previously dumped into the trench silo until it is filled. This will compact the silage into the silo and improve its condition. Plastic cover sheets are then applied over the silage throughout the length and width of the trench silo. Sufficiently large sheets are available to cover the entire silo with one sheet. These sheets are supplied in lengths up to ninety feet and approximately thirty feet wide.

It has been found from tests made with the present invention and a trench silo of the character described that better control of the drying and curing of the silage can be obtained in which the average nitrogen content can be increased up to sixteen percent compared with an average of approximately eleven percent where vertical silos and large volume heaters are used with the silo. In addition, it has been found that with the trench silo and plastic cover, oxygen is substantially eliminated from the trench silo to prevent oxidation of the silage and at the same time retain a much greater percentage of carbon dioxide in the silage. This materially improves the food value of the silage.

The present invention provides for elimination of a large amount of expensive machine equipment heretofore required in the preparation, curing and storage of silage in vertical silos with substantial improvement of the nutrient value of the silage. When the body is not being used for conveying and treating silage it is also useful in hauling feed for cattle as well as serving as a feeder.

By making the body construction of sheet metal members in the formation of the frames for the side, end and bottom walls and using sheet metal wall sections for covering the side and end walls and the sheet metal floor members, it will be understood that substantially rigid, strong and lightweight body construction may be readily fabricated in a convenient way to produce a body construction that is relatively inexpensive.

A mechanism for pulling the doors 18 into closed position operable by the operator of the tractor from his seat on the tractor is shown in FIGS. 16 to 19 inclusive. Each door is independently operated by duplicate mechanism. Cable anchors 156 are mounted on the bottom edge of each door 18. These cable anchors 156 are mounted so that one anchor is mounted at the front end, another at the central portion and a third at the rear bottom edge of each door. A main operating cable 158 has the rear end attached to the rear cable anchor 156 on one of the doors 18 and another similar cable 158 is similarly attached to the rear anchor on the other door. A pair of rear outer guide pulleys 160 are mounted on rear bottom channel bar 66, one at each outer end thereof. Each pulley 160 guides one of the cables 158 between the lower end of the doors and the central portion of the bottom 16 of the body. Two rear central guide pulleys 162 have their brackets mounted on the top portion of the rear bottom channel bar 66 at opposite sides of the center thereof for receiving and guiding main operating cables 158. Each cable 158 extends from the door over the adjacent pulley 160 and then about the adjacent central guide pulley 162. The main operating cables 158 extend forwardly from the guide pulleys in adjacent substantially parallel relation above the frame bars 24 and forwardly beyond the front end of the body, above the bottom channel bar 48.

A supplemental cable 164 has one end attached to the centrally located cable anchor on the door 18 at one side of the body and then extends inwardly toward the center of the body. The supplemental cable 164 is guided over an outer intermediate guide pulley 166 mounted on and extending downwardly below the outer end of the transverse frame bar 24 located in the central portion of the bottom of the body. The supplemental cable 164 extends inwardly from the guide pulley 166 adjacent to the frame bar 24 and engages about an intermediate central guide pulley 168 with the end portion extending forwardly along the main operating cable 158 at the same side of the center of the body. The end portion of the supplemental cable 164 is attached to the main operating cable 158 at a distance forwardly of the guide pulley 168 sufficient for the door controlled thereby to fully open without having the connection of the supplemental cable 164 to the cable 158 engage the pulley 168. Another supplemental cable 164, guide pulley 166 and guide pulley 168 are mounted in a similar manner at the opposite side of the body for connecting the central portion of the opposite door to its main operating cable.

A front supplemental cable 170 has one end secured to the front cable anchor 156 on one of the doors and then extends inwardly over an outer front guide pulley 172 which is mounted on and extends downwardly from the bottom channel bar 48. Then cable 170 extends inwardly to the central portion of the body and upwardly above and along the bottom channel bar 48 where it engages over the front central guide pulley 174. The cable 170 extends forwardly from pulley 174 adjacent to the main operating cable 158 at the same side of the body and has the forward end suitably attached thereto so that sufficient lineal movement of the cable may take place for full opening movement of the door without the end of the supplemental cable 170 running over the central guide pulley 174. Another supplemental cable 170, and guide pulleys 172 and 174 are provided for the door at the opposite side of the body.

The intermediate central guide pulleys 168 and the front central guide pulleys 174 guide the adjacent portions of the respective main operating cables 158 as clearly shown in FIG. 16.

A supporting arm 176 of channel shape or the like in cross section, has its lower rear end adjustably and pivotally mounted in a supporting bracket 178 secured to the front central portion of the bottom frame bar 48, as shown in FIGS. 16 and 17. The forward end of the supporting arm 176 carries a double winch 180 of any suitable conventional form. The main operating cables 158 extend from the front central guide pulleys 174 forwardly over the guide pulleys 182 mounted on the rear end of the supporting arm 176 and then to the winch 180 for attachment to the winding drums in the winch in a well known manner. Each cable 158 is attached to a separate winding drum in the winch 180 so that each cable may be independently wound or unwound from its winding drum. The winch 180 is provided with the usual handles, clutches and clutch controls so that each cable may be manually wound on the winch and the clutches and clutch controls or the like operated in the conventional manner.

With the construction shown in FIGS. 16 to 19 inclusive, the supporting arm 176 will extend to a convenient location for the operator of a tractor pulling a trailer carrying the body to reach the winch 180 from the seat of the tractor. The operator can conveniently operate the winch 180 to pull one or both of the doors 18 into closed position. The clutch and clutch controls of the winches 180 will then lock the drums from rotation to hold one or both doors closed. The clutch control and clutch may subsequently be operated to release the cables for opening the doors. The supporting arm may be adjusted to support the free end carrying the winch at the desired height for convenient operation from a tractor seat.

A modified form of operating mechanism for the doors is shown in FIGS. 20 and 21. In this modified construction the length of the connecting lever 124 and the connecting section 126 is adjusted so that the operating lever 114 will not pass dead center position when the door is closed, as shown in FIG. 20. The stop projection 136 is also positioned on the operating shaft 110 so that the lever 114 will not move past the dead center position when the door is open. A cylinder 184 has the inner end pivotally mounted on the bracket 186 attached to the top face of the bottom channel bar 48 of the body. The piston in the cylinder 184 has the outer end of the piston rod 188 pivotally attached to an intermediate portion of the operating arm 114, as shown in FIG. 20. A conventional form of cylinder and piston are used to operate the lever 114 either by compressed air or other hydraulic fluid of a desired character. The cylinder is provided with the usual conventional ports and connections at opposite ends so fluid may be forced into and exhausted from either end of the cylinder for moving the piston back and forth between opposite ends of the cylinder. Suitable hose connections 190 are attached to opposite ends of the cylinder 184 and extend to a conventional form of fluid supply and control unit 192 mounted on the end of an adjustable supporting arm 194 similar to supporting arm 176. The control unit 192 will have suitable controls for supplying fluid under pressure to the cylinder 184 for moving the piston toward the outer end of the cylinder for moving the operating lever 114 to open the door or moving the piston inwardly to close the door. The cylinder 184 is mounted in parallel relation on the bottom frame bar 48 and in substantially perpendicular relation to the plane of the door.

A separate cylinder, piston and control unit is provided for operating the operating lever 114 for each door. The control unit 192 may be any suitable conventional form of fluid pressure apparatus in which a suitable fluid reservoir may be self-contained in the unit and manual operation of a handle and control valves will provide for operation of a self contained pump or the like to force fluid from the control unit into the cylinder for moving the piston to either open or close the door controlled thereby and hold the door in either open or closed position. It will be understood that where the tractor is equipped with a fluid pressure apparatus, suitable detachable connections may be made thereto with the control unit 192 serving to provide the tractor operator with control handles for securing operation of the piston in the cylinder 184 for opening and closing each door as desired.

The invention discloses both mechanical and fluid pressure operated mechanism for moving and retaining the doors in either open or closed positions with remote controls located in front of the body adjacent to the tractor operator's location on the tractor. The tractor operator can operate the remote control without leaving the tractor thereby saving time and providing convenient and efficient means for operating either or both doors between open and closed positions.

The usefulness of the body is additionally facilitated in the handling of materials by providing a vertically extending longitudinal partition wall 125 in the center portion. This partition 125 is shown in FIGS. 2, 5, and 6. Only fragments of the partition are shown in FIGS. 5 and 6 for convenience in illustration. The partition has an angular flange along the bottom edge secured to one of the floor forming sections 38 along the central ridge portion 36. The partition 125 extends between the front and rear end walls 10 and 12 respectively in vertical relation above the ridge portion 36. The upper end of the partition carried a bar extending in inclined relation from the front to the rear end walls where the terminal portions are rigidly attached to top channel bar 44 at the front end and top channel bar 62 at the rear end. This central partition wall 125 effectively divides the body into two compartments which may be loaded with different materials. The material in each compartment may be selectively discharged by operating the door at the side of the body for discharging the material as above described.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A side discharge vehicle body, comprising a plurality of transverse frame members of substantially triangular shape having a bottom transverse supporting bar, a pair of bottom wall bars secured together at one end and having the opposite ends extending in inclined relation to each other and attached to the ends of said bottom transverse supporting bar at opposite sides of said body, a plurality of bottom floor members extending longitudinally between opposite ends of said body, each floor member having a floor forming section, side flanges extending laterally in the same direction from said floor forming sections and marginal strips on the free edges of said side flanges in spaced substantially parallel relation to said floor forming section, said floor members having adjacent side flanges engaging one another with a plurality of floor members mounted in adjacent engaged relation on said bottom wall bars and extending transversely from the outer side edges of said body and transverse frame members in upwardly inclined relation to the central portion of said body, said floor members terminating in spaced relation at the inner upper ends of said bottom wall bars, means securing the adjacent side flanges of adjacent floor members together in assembled relation, means securing said marginal strips to said bottom wall bars, a ridge member extending between opposite ends of said body and between the sides of adjacent spaced floor members having a pair of floor forming sections extending in the same angular relation to each other as the angular relation between said bottom wall bars of said frame and having side flanges extending laterally from the floor forming sections and engaging adjacent side flanges on adjacent floor members and having marginal strip portions on the free edges engaged with the inner ends of said bottom wall bars on opposite sides of the connection there between means attaching said marginal flanges of said ridge member to said bottom wall bars, end walls mounted at opposite ends of said bottom floor members, side walls connecting the side edges of said end walls along opposite sides of said bottom floor members and cooperating with said end walls in forming a compartment above said bottom floor members, and doors mounted on said side walls for closing openings therein terminating along the side edges of said bottom floor members and movable to open positions for allowing discharge of material in said compartment by sliding movement down the inclined surfaces of said bottom floor forming sections of said bottom floor members.

2. A side discharge vehicle body comprising a bottom wall having a plurality of transverse frame members mounted in spaced parallel transversely extending relation between the sides of said body, said frame members having bottom substantially horizontal supporting portions and bottom wall bars mounted in inclined relation with the center portion of said bars spaced above said bottom supporting portions and extending downwardly and outwardly to the ends of said supporting portions at the sides of said body, a plurality of floor members mounted on said bottom wall bars, extending between opposite ends of said body and having adjacent edges engaging one another for forming inclined bottom wall portions extending from the central portion in spaced relation at opposite sides of said center portion of said bottom wall bars to the outer lower edge of said bottom wall bars at the side edges of said body, said floor members having floor forming sections lying in edge to edge substantially coplanar relation to form substantially smooth bottom wall surfaces inclined downwardly and outwardly from the central portion toward the sides, and side flanges at the side edges of said floor forming sections extending downwardly therefrom and engaging said bottom wall bars for supporting said floor forming sections in spaced relation to said bottom wall bars, said side flanges on adjacent floor forming sections engaging one another, means securing said floor members to said bottom wall bars, a ridge member mounted between the inner edges of said floor members at the top center portion of said bottom wall bars having floor forming sections at opposite sides extending in angular relation and side flanges extending downwardly from the side edges thereof engaging adjacent side flanges on adjacent floor members at each side of said center portion, means securing said ridge member to said bottom wall bars with the floor forming sections thereof engaged in substantially coplanar relation with the floor forming sections of said floor members and forming the ridge along which the inclined bottom wall surfaces intersect at the central portion of the bottom of said body, end walls mounted on the ends of said bottom wall, side walls mounted along the side edges of said bottom wall for cooperation to form a compartment for holding material for discharge by gravity downwardly and outwardly at the sides of said body, doors mounted on said side walls for controlling discharge of material from said compartment, and means for controlling operation of said doors.

References Cited by the Examiner

UNITED STATES PATENTS

| | | | |
|---|---|---|---|
| 146,573 | 1/1874 | Collins et al. | 119—58 |
| 726,541 | 4/1903 | Kiesel | 105—299 X |
| 789,155 | 5/1905 | Kiesel | 105—255 |
| 1,453,402 | 5/1923 | Meyer | 296—24 |
| 1,483,893 | 2/1924 | Kipp | 105—254 |
| 1,587,552 | 6/1926 | Press | 296—28 |
| 1,593,748 | 7/1926 | Campbell | 105—255 |
| 1,682,610 | 8/1928 | Fell | 296—14 |
| 2,034,537 | 3/1936 | Schmohl | 105—254 X |
| 2,830,558 | 4/1958 | St. Pierre | 119—58 |
| 3,004,518 | 10/1961 | Struckhoff | 119—58 |
| 3,077,841 | 2/1963 | Lunde | 105—255 |
| 3,090,133 | 5/1963 | Kline et al. | 34—174 |
| 3,107,160 | 10/1963 | McClaren | 34—174 |

FOREIGN PATENTS 465,075    4/1937    Great Britain.

OTHER REFERENCES

German printed application No. G10,143 II/20C, April 1956.

ARTHUR L. LA POINT, *Primary Examiner.*

JAMES S. SHANK, *Examiner.*

H. BELTRAN, *Assistant Examiner.*